United States Patent Office 3,609,850
Patented Oct. 5, 1971

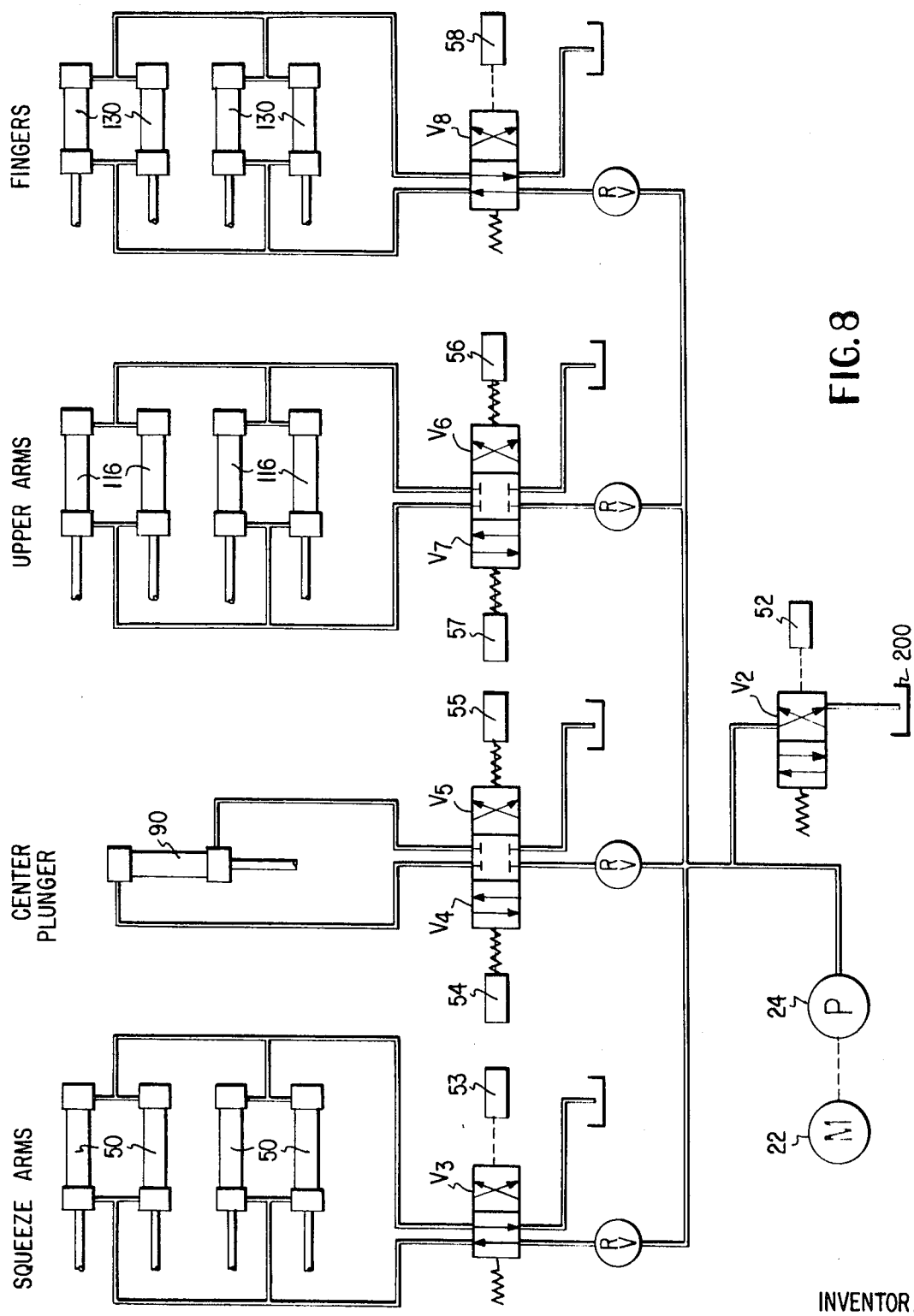

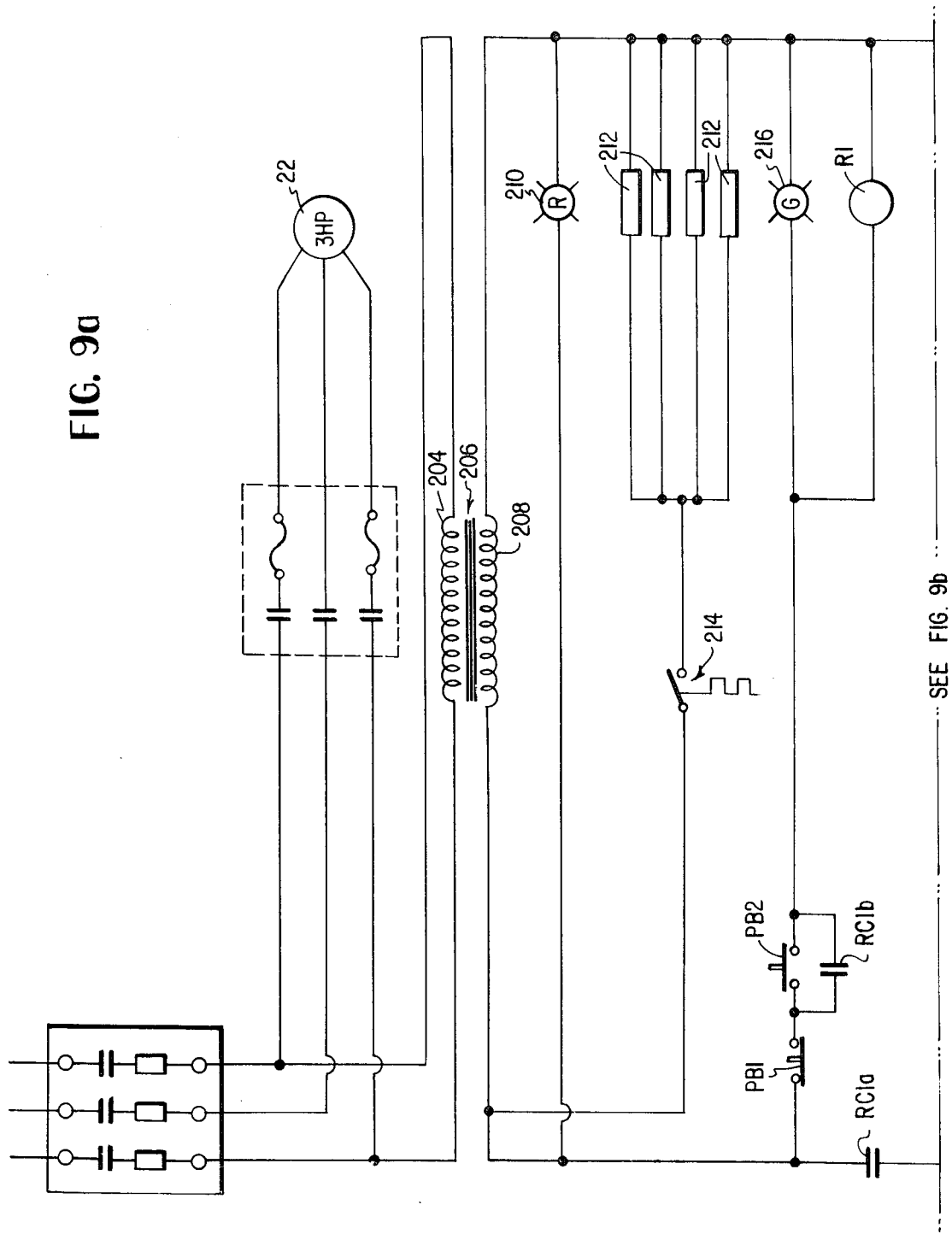

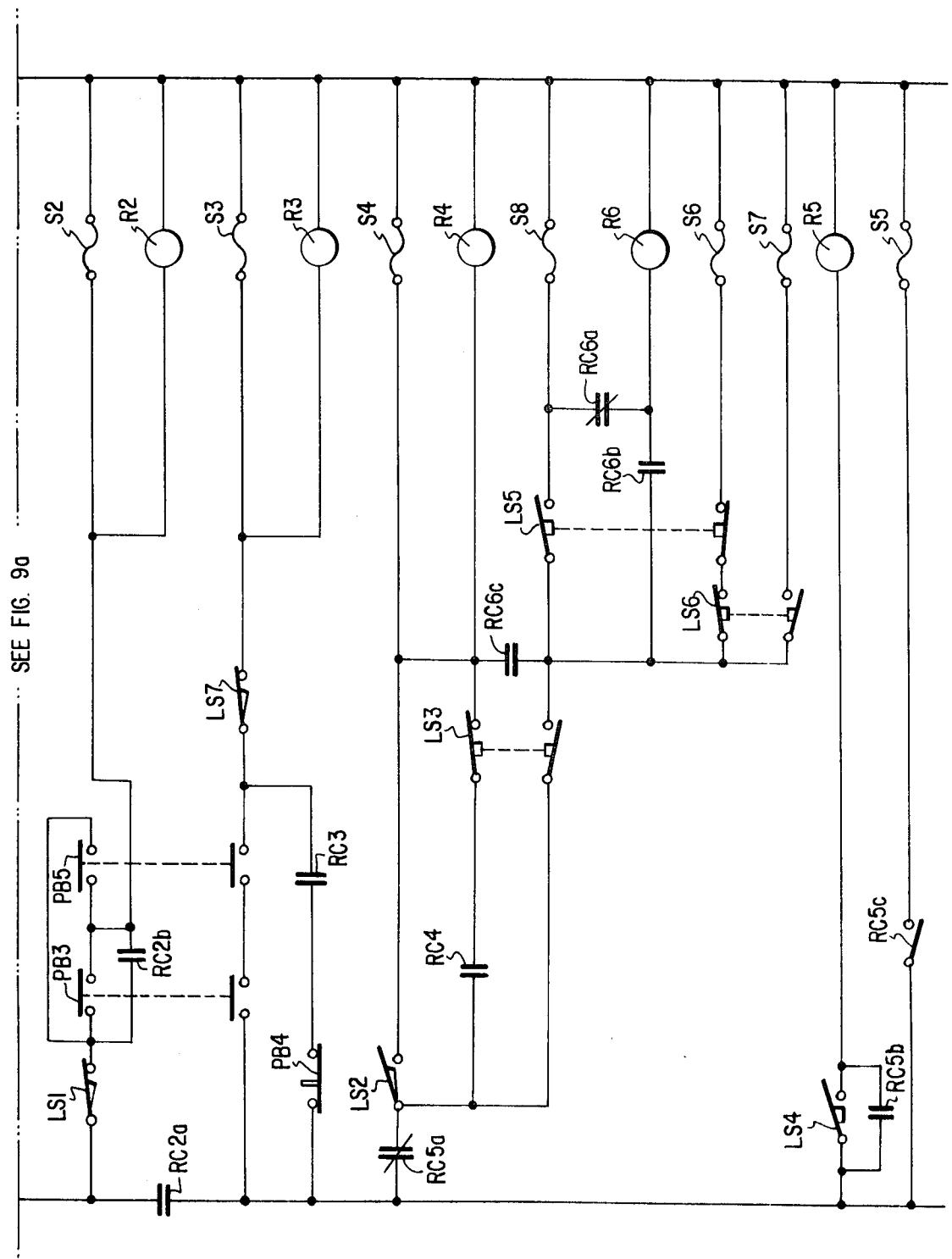

3,609,850
MACHINE FOR APPLYING REINFORCING
RINGS TO CONTAINERS
Houston Rehrig, Pasadena, Calif.
(4291 Bandini Blvd., Los Angeles, Calif. 90023)
Filed Oct. 24, 1969, Ser. No. 869,239
Int. Cl. B23p 19/04, 11/00
U.S. Cl. 29—208 B
25 Claims

ABSTRACT OF THE DISCLOSURE

Reinforcing rings are applied to extertior seat portions of containers of the type shown in U.S. Pat. 3,419,182 by a mhcaine which operates on the containers when they are in a pliable condition. Initially, a container is collapsed by pressing its axially-aligned edges inwardly with four pivoted squeeze arms to bow the sidewalls inwardly until the outside dimensions of the ring-retaining rim on the container are less than the inside dimensions of the reinforcing ring. The ring is then placed on a supporting surface on the squeeze arm at a position where it is radially aligned with the seat portion of the container. The squeeze arms ar released, thereby permitting the container to expand somewhat to hold the ring in position. Final expansion of the container is performed by a plunger which moves axially into the container to force the sidewalls outwardly.

When applying reinforcing rings which have upstanding tangs which are received in apertures in the rim of a container, there is a central plunger which moves into the container after release of the squeeze arms to hold the sidewalls in a given position. Upper arm assemblies then move toward the outer surfaces of the sidewalls to project fingers which raise the container rim in the vicinity of the tang-receiving openings. Further movement of the plunger presses the container walls outwardly until the tangs enter the rim apertures; and, finally, a surface on the plunger forces the rim downwardly in the vicinity of the tangs.

---

The purpose of this invention is to minimize the time and expense of applying reinforcing rings to containers of the type shown in U.S. Pat. 3,419,182 which issued on Dec. 31, 1968 to Richard F. Gildart. The entire specification of that patent is incorporated herein by reference and, for purposes of uniformity, identical reference numerals have been applied to corresponding elements of the container shown in the drawings of this specification.

Briefly, these containers include a rectangular bottom wall and four sidewalls which are connected together along mutually parallel edges which are normal to the bottom wall. To simplify the nomenclature, this specification has adopted the terms "radial" and "axial" to describe directions which are parallel and normal, respectively, to the bottom wall of a container of this type.

These containers include, near their upper portions, a channel 11 which provides a seat for a reinforcing ring 15. The lower boundary of the seat is defined by a flange 9 or other means for preventing downward movement of the reinforcing ring. The upper margin of the seat is formed by a container flange or rim portion 10. Preferably, but not essentially, the reinforcing ring 15 is provided with axially extending tabs or tangs 17 which are adapted to extend through corresponding apertures 12 in the rim portion 10 of the container 1.

Prior to this invention, it has been the practice to apply the reinforcing rings 15 to the containers 1 by manual operations soon after molding the plastic container and while it remains pliable from its heat of formation. Such a manual operation is difficult and time consuming, and it is rendered unnecessary by the invention which is described herein.

One important and novel concept utilized in the machine of this invention involves the apparatus for collapsing the walls of the container to permit the reinforcing ring to be applied, in combination with means for pressing the container walls outwardly after the ring is applied. This includes means for pressing the walls of a container inwardly until the outside dimensions of the container rim portion are less than the inside dimensions of the reinforcing ring, means for supporting a reinforcing ring in radial alignment with the seat portion of the container, and expanding means for pressing the container walls outwardly to a position where the rim portion is axially aligned with the reinforcing ring to prevent removal of the reinforcing ring from the container. Although various instrumentalities may perform the functions, the preferred and disclosed apparatus has pivoted squeeze arms which operate on the axially-aligned edges of the container where the sidewalls interconnect in order to bow the sidewalls inwardly. The means for supporting the reinforcing ring is a small shelf-like support located on the squeeze arms; and, the expanding means for pressing the container walls outwardly is a plunger which is movable axially into the container.

Another inventive concept found in the disclosed machine relates to the elements for collapsing the container walls and holding the reinforcing ring in position. This includes the collapsing means which force the parallel container edges radially inwardly to bow the sidewalls inwardly until the outside dimensions of the container rim portion are less than the inside dimensions of the reinforcing ring, and means for holding a reinforcing ring in radial alignment with the seat portion of the container. Another novel concept involves the container collapsing means which, themselves, carry the means for holding the reinforcing ring in radial alignment with the seat portion of the container.

The machine incoporates other important features which are particularly suited to the application of reinforcing rings which have axially extending projections to containers with apertured rim portions. For example, there is a plunger surface which holds the container walls in position after the collapsing means has been retracted, and an upper arm assembly which carries fingers for raising the container rim portion in the vicinity of the tang-receiving apertures piror to the final expansion of the container walls by the plunger. This and the concepts mentioned above are described in some of the claims of this specification and may be understood upon reviewing the following descriptions and the accompanying drawings wherein FIG. 1 is a front elevational view of a preferred form of the apparatus;

FIG. 8 is a diagrammatic view of the hydraulic system utilized in the apparatus;

FIG. 9 is a wiring diagram of the control circuitry for the apparatus; and

Preferably, the disclosed apparatus operates on plastic containers soon after they are molded so that they are still pliable from the heat of formation. This apparatus performs several functions, some of which may be eliminated if it is used to apply reinforcing rings to other types of articles.

Figure 1:
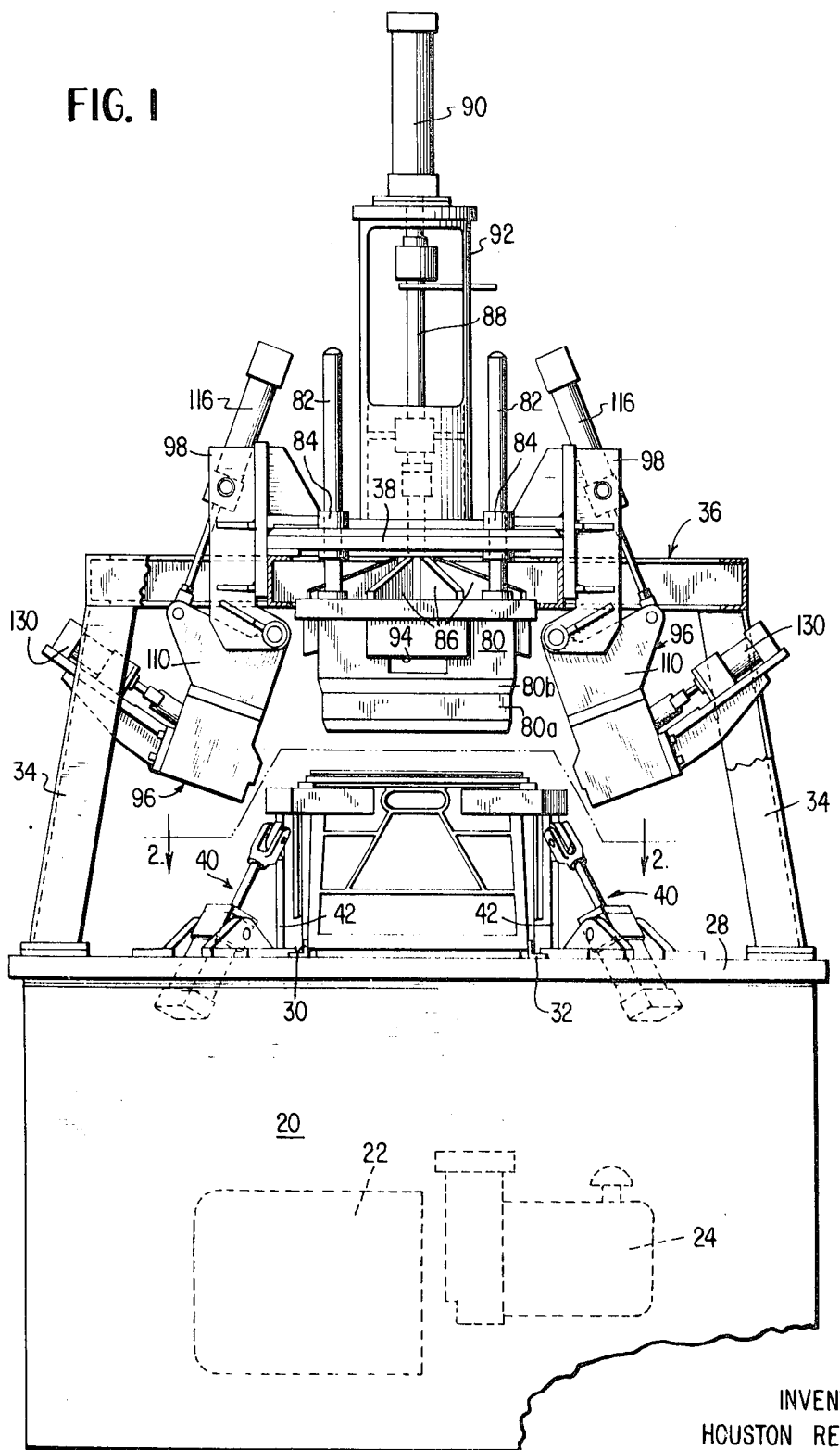

Referring to FIG. 1, it will be seen that the preferred apparatus includes a housing 20 enclosing an electric motor 22 for driving the main hydraulic pump 24. The housing 20 is mounted on casters 26 for portability. The main platform 28 of the machine is located on the upper surface of the housing 20 and is provided with guide members 30 and 32 which are used to position containers properly in the machine. Legs 34 are located at each of the four corners of the main platform 28 to support an upper frame assembly 36 which carries the upper mounting plate 38 of the apparatus. This upper plate member 38 supports the upper arm assemblies and the plunger member which will be described in greater detail in a later portion of this description.

The first function of the apparatus is to collapse the container so that the reinforcing ring may be placed thereabout in alignment with the ring-receiving seat portion on the exterior surface of the container.

Figure 2:
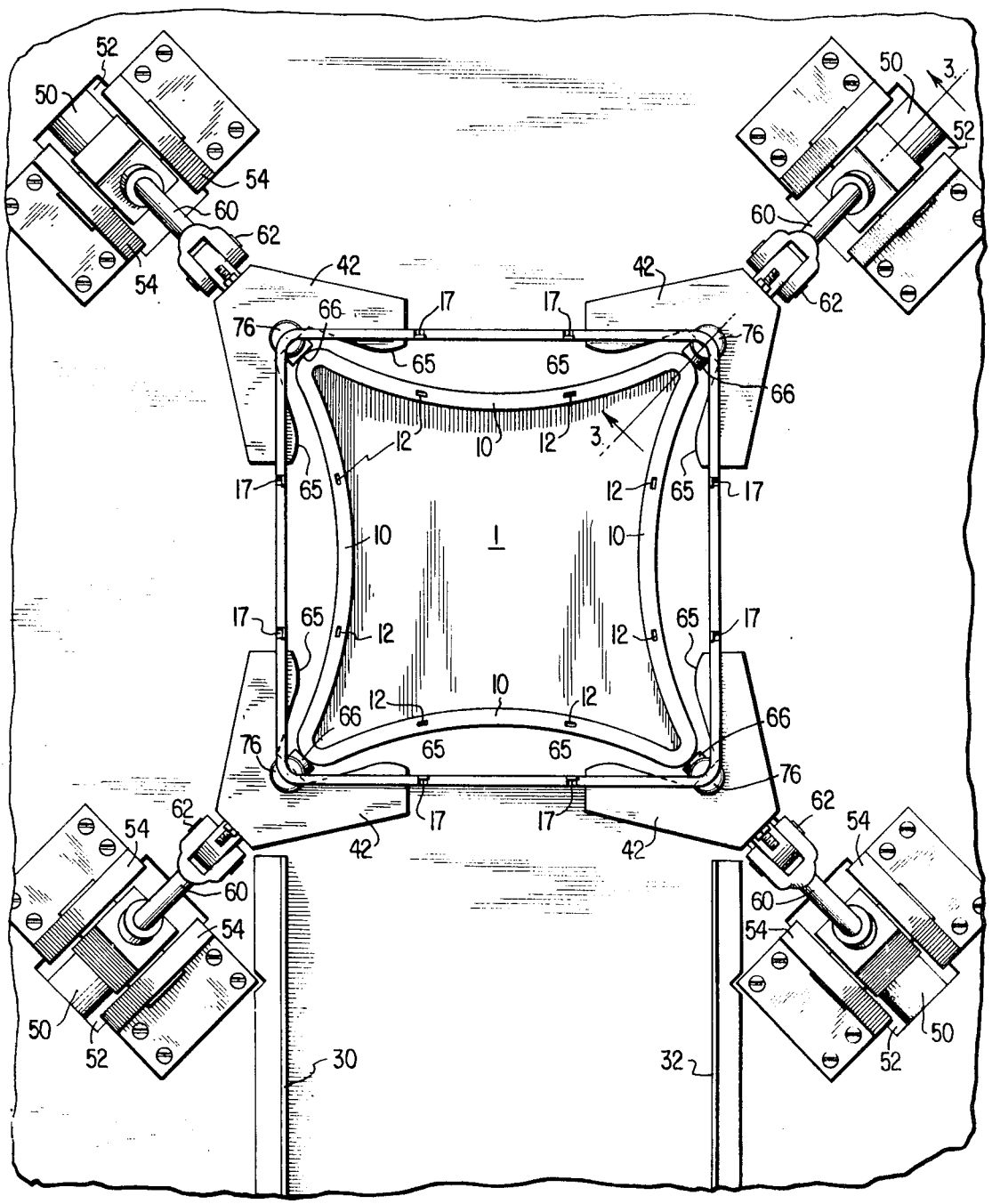
FIG. 2 is a plan view taken along the line 2—2 in FIG. 1, showing the squeeze arms in their operative position and the container walls pressed inwardly so that their outside dimensions are less than the inside dimensions of the reinforcing ring.
Figure 3:
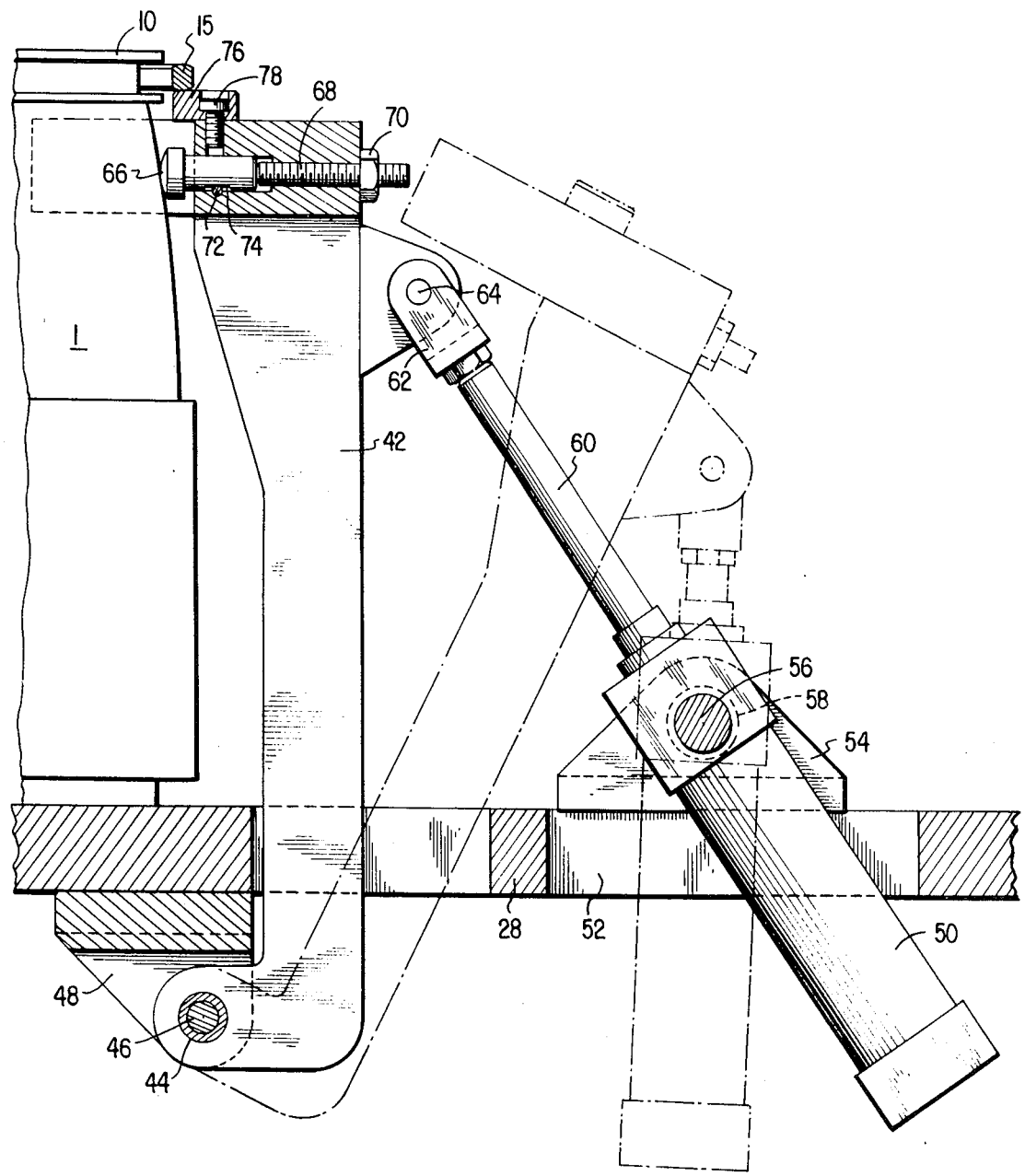
FIG. 3 is a view taken along the line 3—3 in FIG. 2 to show a squeeze arm in its operative position.

The elements used for collapsing a container are the four squeeze arm assemblies 40 which are supported on the main platform 28 of the apparatus. Details of their construction are best seen in FIGS. 2 and 3. Each of these squeeze arm assemblies includes a main arm 42 which has, at its lower end, a bearing sleeve 44 pivotally surrounding a pin 46 connected to the stationary bracket members 48.

Each of the squeeze arms 42 is operated by a hydraulic ram 50 which passes through an opening 52 in the platform 28 and is pivotally attached to the platform 28 by pairs of bracket members 54. A pin 56 is attached to the ram 50 and is received in a sleeve bearing 58 in the respective bracket members 54. The rod 60 of the hydraulic ram 50 carries an axially-adjustable bifurcated fitting 62 at its outer end which is pivotally connected to the squeeze arm 42 by a pin 64.

The head at the upper end of each squeeze arm carries surfaces 65 which deflect the sidewalls inwardly and prevent them from bowing outwardly. Each head carries a pressure pad 66 which is adapted to contact a vertical edge of the container in the manner shown in FIG. 2. The degree to which the pressure pad projects from a squeeze arm may be adjusted by rotating the threaded shaft 68 and locking it in position with the lock nut 70. A key 72 rides in a keyway 74 in the pressure pad member 66 to prevent its rotation and loss.

An important feature of the invention is that each of the squeeze arms carries means for supporting a reinforcing ring in radial alignment with a seat portion of the container. This supporting means is the member 76 which is attached to the squeeze arm by a bolt 78 where the elevation of its upper surface will hold the reinforcing ring 15 in precise radial alignment with the seat 11 beneath the container rim 10.

The inoperative position of a squeeze arm is shown in broken lines in FIG. 3. When in this position, a container may be moved into the apparatus between the guide rails 30 and 32 which are shown in FIGS. 1 and 2.

Then, the squeeze arms are moved to their solid line positions by the hydraulic rams 50 until the pressure pads 66 apply pressure to the parallel edges of the container. This bows the sidewalls inwardly as shown in FIG. 2 until the outside dimensions of the container rim 10 are less than the inside dimensions of the reinforcing ring 15. When the container is so collapsed, the reinforcing ring 15 is placed on the four ring-supporting members 76 as shown in FIGS. 2 and 3, where it will lie in radial alignment with the seat portion of the container. Next, the squeeze arms 42 are retracted by the hydraulic rams 50 so that the container will return toward its initial position, and the reinforcing ring will be held in position by the container.

If the containers have a high degree of resilience and the reinforcing ring is not provided with the tangs 17 which extend through apertures 12 in the container rim, only the apparatus shown in FIGS. 2 and 3 is required. However, when a container is a hot thermoplastic material which is not totally resilient, it is necessary to provide means for expanding the sidewalls of the container outwardly in order to force the external seat portion of the container against the inner surface of the reinforcing ring. This expansion is performed in the disclosed machine by the axially movable plunger 80 which is shown in FIGS. 1 and 4–6.

Referring to FIG. 1, it will be seen that the plunger 80 carries a series of vertical guide rods 82 which are slidably received in the guide sleeves 84 on the upper plate 38. A series of reinforcing ribs 86 on the upper wall of the plunger body are connected by an actuating rod 88 to the hydraulic ram 90. The cylinder portion of ram 90 is attached to the plate 38 through the open cylindrical framework 92.

The plunger 80 has three functions. The first of these functions is properly to position the container walls for the operation of a rim-lifting finger which wil be discussed in a later portion of the specification. The second function of the plunger 80 is to press the container walls outwardly to a position where the container rim is axially aligned with the reinforcing ring so that removal of the reinforcing ring from the container is prevented. This function is performed by the tapered area 80b which contacts the interior of the container walls to expand them outwardly. The third function of the plunger is performed by the generally radially oriented surfaces 94 which press the container rim portion downwardly toward the reinforcing ring at the lowermost position of the plunger stroke. This is particularly useful when the container rim portion has been deformed by rim lifting fingers if any are employed in the apparatus.

Whenever a reinforcing ring has upstanding tangs 17 which engages apertures 12 in a container rim portion, the machine is provided with upper arm assemblies which carry extensible fingers for raising the rim prior to final expansion of the container. Such an upper arm assembly is designated 96 in FIG. 1 and is shown in greater detail in FIG. 4.

Figure 4:
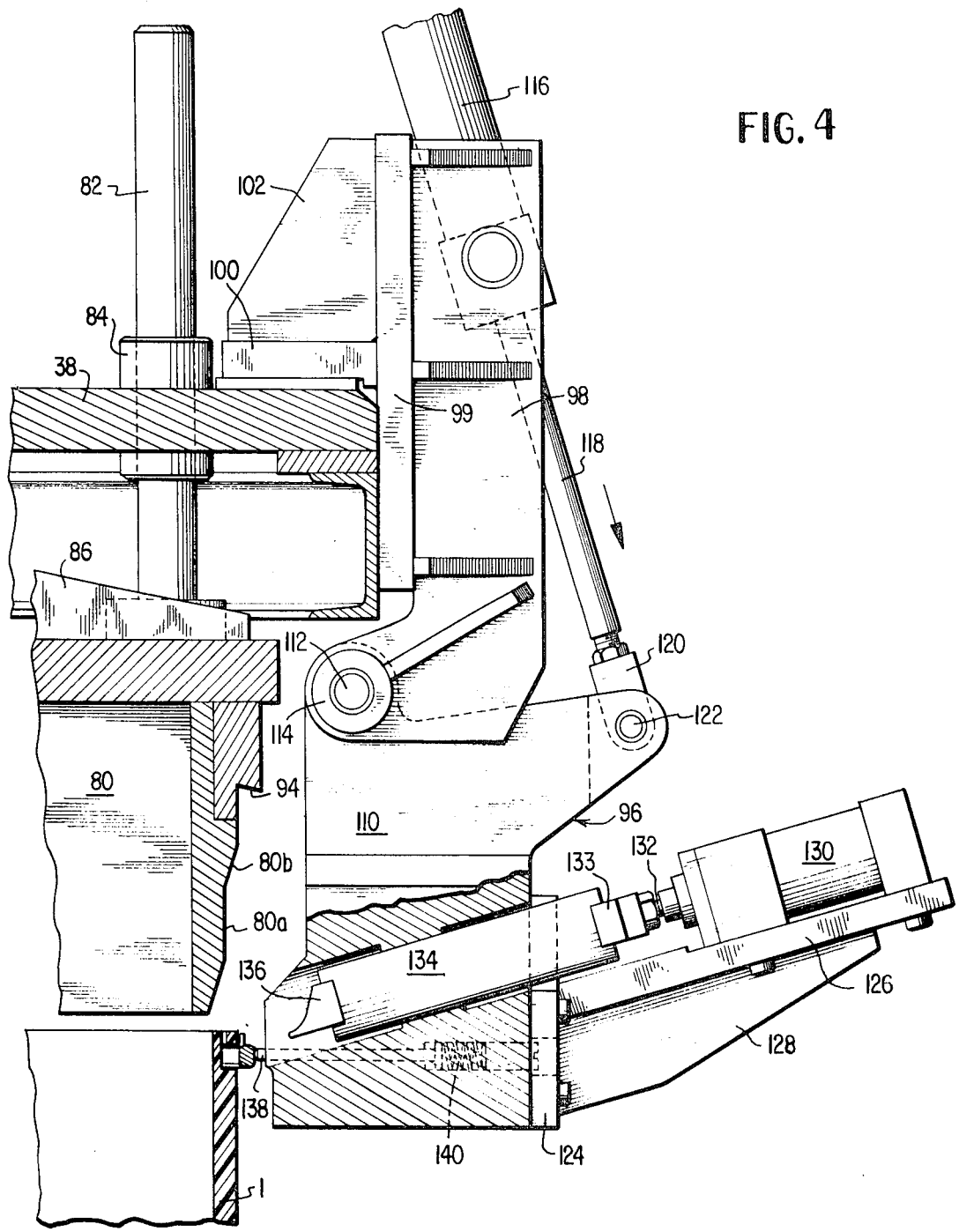
FIG. 4 is an elevational view, partially in section, showing one of the upper arm assemblies in its operative position before the extension of the rim-lifting fingers.

Referring to FIG. 4, it will be seen that the upper arm assembly is pivotally supported between a pair of vertical plates 98 which are connected to the upper plate 38 by plate 99, a base portion 100 and a reinforcing web 102. The upper arm itself is shown at 110 and it carries a pin 112 which rides in bearings 114 on the plates 98. Pivotal movement of the arm 110 about the pin 112 is initiated by the hydraulic ram 116 which has a rod 118 with an end fitting 120 connected to spaced apart ears of the arm 110 by a pivot pin 122.

Figure 5:
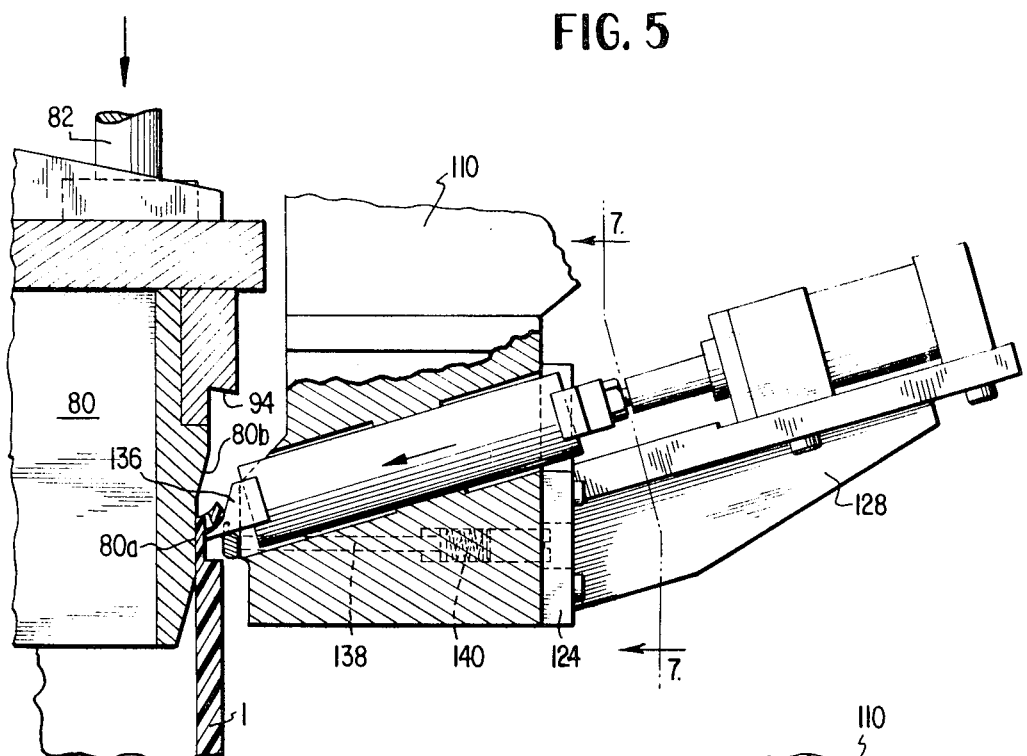
FIG. 5 is a view similar to FIG. 4, taken after extension of the rim-lifting fingers and after movement of the central plunger to its sidewall-holding position.
Figure 6:
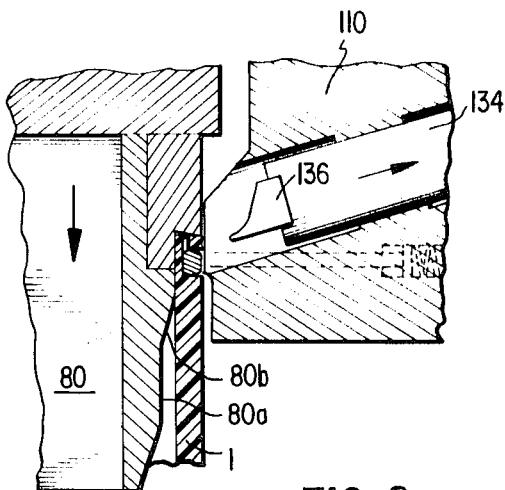
FIG. 6 is similar to FIGS. 4 and 5, but shows final expansion of the container walls and the container rim portion seated over the reinforcing ring with the tang extending through associated apertures in the container rim portion.
Figure 7:
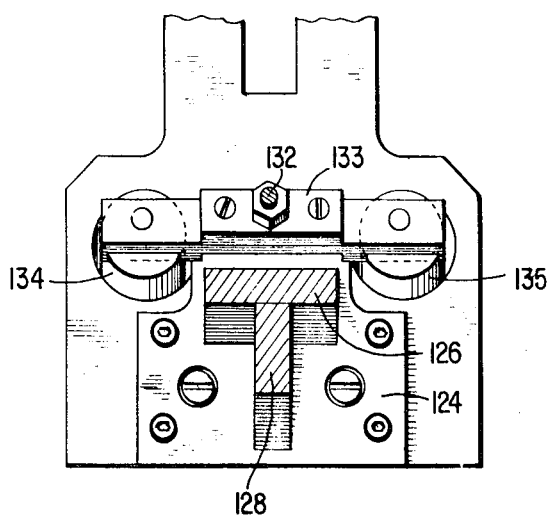
FIG. 7 is a view taken along the line 7—7 in FIG. 5 to show the presence of two rim-lifting finger assemblies on the upper arm assembly.

The lower end of the upper arm 110 carries a bracket having a base 124, a platform 126 and a reinforcing flange 128. A hydraulic ram 130 is mounted on the upper surface of the platform 126 and has its actuating rod connected through an adjustable shaft 132 to a connector bar 133. As shown in FIG. 7 the connector bar attaches to a pair of reciprocating plungers 314 and 135 which carry fingers 136 at their ends. Near the fingers, there is a rod 138 which is normally extended by a spring 140 at a location where it will contact the outer surface of the reinforcing ring as shown in FIG. 4. The location of the fingers is such that, when extended to their operative position, they will axially deflect the rim portion of the container away from the ring-reeciving seat portion. As shown in FIG. 5, this is done prior to movement of the expanding surface 80b into the container.

In order for the upper arm assemblies to properly function, it is desirable to hold the container walls in a given position prior to operation of the fingers. This positioning or holding step was referred to briefly in describing the plunger 80. Essentially, this involves the movement of the plunger 80 to a first position where its surface 80a contacts the interior surface of the container sidewalls in order to hold the walls in a given position. When the walls are so held, as shown in FIG. 5, the finger is extended. Then, the plunger moves downwardly so that surface 80b presses the container walls out to a position where the container rim is axially aligned with the reinforcing ring. At the same time the upstanding tangs on the reinforcing ring enter the corresponding apertures in the container rim. Finally, as the plunger reaches the lower end of its stroke, the surface 94 presses the container rim against the reinforcing ring and eliminates any marks which operation of the fingers may have made in the thermoplastic material.

The overall sequence of operation of the apparatus will easily be understood from the foregoing description. First, the container, preferably in a pliable condition, is moved between the guides 30 and 32 to the working station on the platform 28. The squeeze arms 42 are moved inwardly so that their pressure pads 66 will press radially inwardly on the four vertical edges of the container. This bows the sidewalls inwardly as shown in FIG. 2 until the outside dimensions of the containers rim portion are less than the inside dimensions of the reinforcing ring.

Next, the reinforcing ring is placed on the four surfaces 76. The squeeze arms 42 are retracted so that the container will expand partially to hold the ring in proper alignment with the seat portion of the container. The plunger then moves to the position shown in FIG. 5 where the surface 80a positions the sidewalls of the container. The upper arm assemblies 96 then move downwardly from the position shown in FIG. 1 to the position shown in FIG. 4. When the upper arm assemblies reach their lowermost position, the fingers 136 are automatically extended to lift the container rim portion as shown in FIG. 5 and, a short time thereafter, the plunger 80 is moved downwardly to expand the container with the surface 80b and iron out the rim portion with the surface 94. This completes the installation of the reinforcing ring, so the fingers are retracted, the upper arm assemblies swing outwardly and the plunger returns to its uppermost position.

Figure 10:
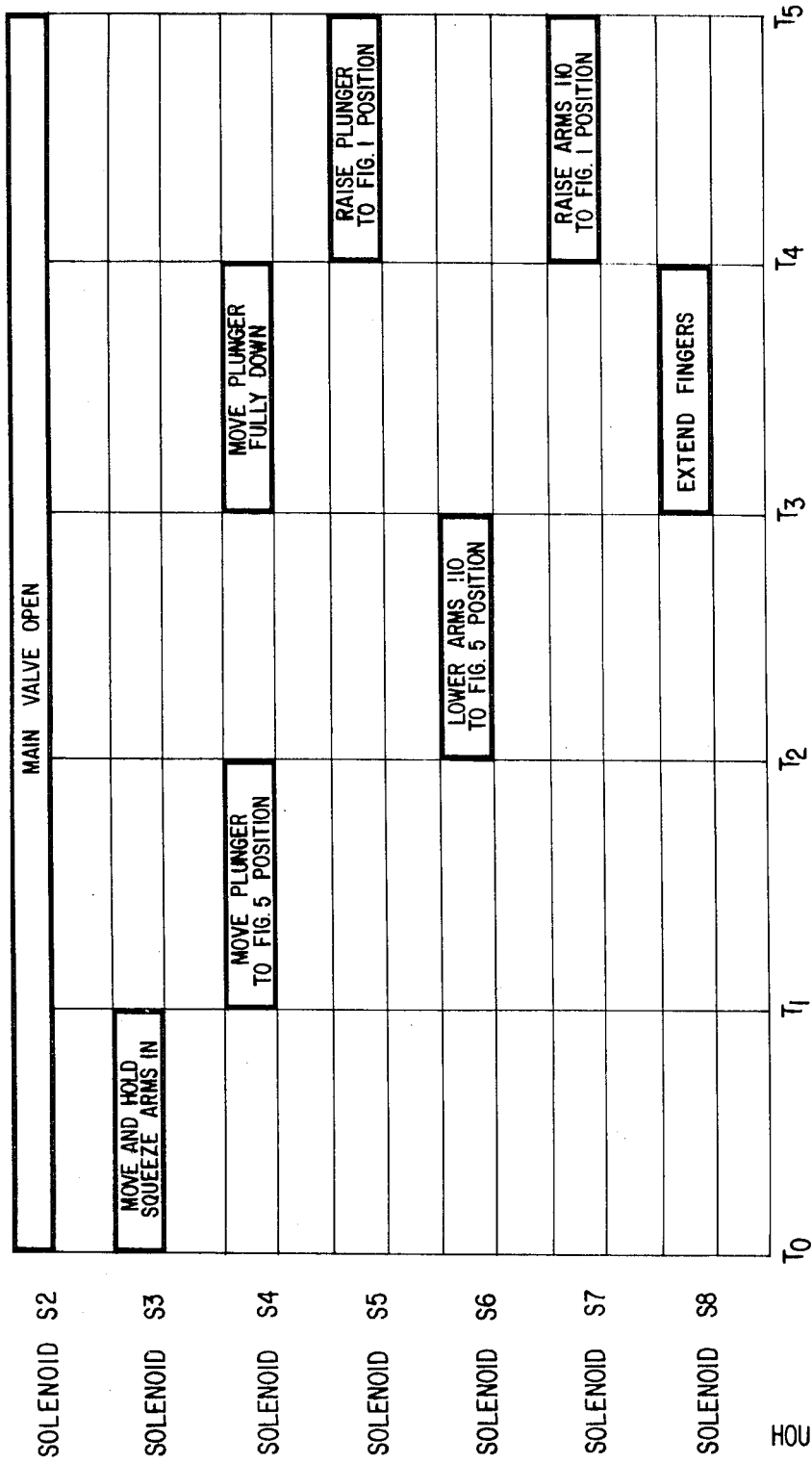
FIG. 10 is a timing diagram which shows the sequence of operations of the hydraulic valves which are operated by the circuitry of FIG. 9.

The hydraulic and electrical systems which operate the machine are shown in FIGS. 8, 9 and 10.

In order to facilitate convenient reference to the drawings, various abbreviations have been selected for the ensuing description. Valve-actuating solenoids have been designated S, while their associated valves carry a corresponding number and are denoted with a V. Relay windings are designated R and their associated relay contact are called RC, with corresponding numbers between a relay winding R and relay contacts RC denoting that the contacts are operated by the designated relay windings. Limit switches are designated LS and push button switches are identified with PB.

FIG. 8 shows the paths of hydraulic fluid from the pump 24 driven by the motor 22 to and from the hydraulic rams which operate the squeeze arms, plunger, upper arm assemblies and fingers. All elements are shown in their inoperative positions with the valve solenoids deactivated. The effluent from pump 24 simply passes through the valve V2 to the sump 200. The fluid from the pump 24 to the squeeze arm rams normally holds the squeeze arms in their retracted positions, and the squeeze arms are extended only upon actuation of the solenoid S3. The plunger is normally in its upper position. Movement to its lower positions results from actuation of solenoid S4 which moves the valve element V4 into operative position, permitting fluid to enter the upper end of the ram 90 and discharge from its lower end. In a like manner, operation of the solenoid S5 will bring the valve element V5 into operation, causing the hydraulic ram 90 to raise the plunger.

Solenoid S7, when energized, results in operation of the valve element V7 so that hydraulic fluid will pass into the lower ends of the hydraulic rams 116 for the upper arm assemblies to raise these assemblies. The solenoid S6 operates the valve element V6 to lower the upper arm assemblies by admitting fluid to the upper end of the rams 116.

The solenoid S8 is operatel to shift the valve V8 into operative position and admits fluid into the outer ends of the finger-extending rams 130. This extends the fingers in the manner shown in FIG. 5.

During the normal operation of the machine, the solenoid S2 is continually actuated so that pressurized hydraulic fluid reaches all hydraulic control valves. During the first phase of the machine operation, solenoid S3 is actuated in order to extend the four hydraulic rams 50 to squeeze the corners of the container. Upon deenergization of solenoid S3, solenoid S4 is operated only long enough to move the plunger down to the position shown in FIG. 5. Then, the solenoid S6 is energized to admit hydraulic fluid to the upper ends of the rams 116 for the upper arm assemblies. Arrival of the upper arms 110 at their lower positions will result in deenergizing solenoid S6 and energizing solenoid S8 to extend the fingers with the hydraulic rams 130. Soon after the fingers extend, the solenoid S4 is again energized to produce the movement of the plunger down to the position shown in FIG. 6. Then, the solenoids S5 and S7 are operated to move the plunger and the upper arm assemblies to their upper positions.

The electrical circuitry for operating the solenoid valves of FIG. 8 is shown in FIG. 9. There, it will be noted that a three phase power supply enters through conventional switching and fusing panels to the motor 22 which drives the hydraulic pump 24. The power is also connected to the primary windings 204 of a transformer 206 which has secondary windings 208 leading to the control circuitry.

Across these secondary windings 208, there is a red indicator lamp 210 and a series of heating elements 212 which are controlled by a thermostat 214 and are located on the center plunger to prevent the chilling of the containers used in the apparatus.

The control circuits are energized by closing the normally open push bottom switch PB2 which completes the circuit to the relay windings R1. This closes the contacts RC1a and RC1b, the latter completing the circuit through the green indicator light 216 and to the windings R1 to maintain the contacts RC1a closed.

Before going further, it is well to outline the instrumentalities which operate the various limit switches. The limit switch LS2 is operated by a squeeze arm 42 and is actuated, i.e. moved from the normal position illustrated in FIG. 9, by movement of the squeeze arms to their retracted position. The limit switch LS5 is operated by one of the upper arms 110 when it arrives at its lower or operating position. The remaining limit switches LS1, LS3, LS4, LS6 and LS7 are all operated from the vertically movable plunger assembly.

The limit switch LS1 is in its closed position at the start of a cycle, so that manual closing of the push button switches PB3 and PB5 will complete the circuit to the relay windings R2 in order to close the two sets of contacts RC2a and RC2b. At the same time, the push button switches PB3 and PB5 will complete the circuit to the relay windings R3, thereby closing the contacts RC3. The closing of the contacts RC2a and RC3 will simultaneously energize the solenoids S2 and S3.

The operation of these solenoids will actuate their respective valve elements and cause the container collapsing means to operate. The operator then places a reinforcing ring in position in the manner previously described. Then, by depressing switch PB4, the solenoid S3 will be denergized and the squeeze arms will return to their retracted position. This retraction will close the limit switch LS2 to energize the solenoid S4 and move the center plunger 80 downwardly. Limit switch LS2 reopens when the squeeze arms reach their rest position. The contacts RC5a will be closed during this movement. When the plunger reaches the position shown in FIG. 5, it will actuate the switche LS3. The actuation of LS3 results in interruption of the circuit to solenoid S4 so that downward movement if the plunger ceases. The lower segment of switch LS3 completes the circuit leading to solenoid S6 through the limit switches LS5 and LS6. The solenoid LS6, as previously explained, operates the rams 116 to move the upper arm assemblies downwardly. When they reach their lower position, the switch LS5 is actuated to interrupt the circuit to solenoid S6 and close the circuit to solenoid S8 which then operates the rim lifting fingers. At the same time, the windings R6 are actuated through RC6a, anl the circuit to relay windings R6 is closed through the contacts RC6b. Soon after the fingers are extended, the circuit to the plunger-operating relay R4 is completed through a time delay device associated with the contacts RC6c. This moves the plunger further downwardly until limit switch LS6 is actuated to move the upper arm assemblies to their retracted positions. Plunger movement also closes the limit switch LS4 when at the position shown in FIG. 6. The closing of limit switch LS4 actuates the windings R5 to open contacts RC5a and close the contacts RC5b and RC5c. This operates the solenoid S5 to move the plunger upwardly. When the plunger arrives at its uppermost position, the limit switch LS1 is momentarily opened to deenergize the entire control circuitry. When the apparatus arrives at its rest position at the completion of a cycle, all elements will have returned to the condition illustrated in FIG. 9.

The sequence of operations of the various valve-operating solenoids is shown in FIG. 10, with a brief indication of their functions during the various phases of the operation. At the time $T_0$ the operator compresses the push buttons PB3 and PB5 in order to actuate the solenoid S3 and move the squeeze arms inwardly. The ring is put on the collapsing arms and then, at time $T_1$ the operator pushes the push button PB4 to release the squeeze arms which retract to actuate the switch LS2. This operates solenoid S4 so that the plunger moves downwardly to its first position which is shown in FIG. 5. This movement shifts the limit switch LS3 to actuate the solenoid S6 and move the upper arm downwardly. At the time $T_3$, when the upper arm reaches its operating position, the limit switch LS5 is actuated and the rim-extending fingers are projected due to operation of the solenoid S8. Soon thereafter, through time delay circuitry, the solenoid S4 is actuated to move the plunger further downwardly to shift the switch LS6 and raise the arm by operating the solenoid S7. When the plunger reaches its lowermost position, LS4 is closed to actuate solenoid S5 and raise the plunger until it reaches its upper position where the limit switch LS1 opens.

From the foregoing description, it will be appreciated that this invention provides an effective machine well suited for its task of applying a reinforcing ring to exterior seat portions of containers. Of course, the particular construction of the machine will vary with the nature of the container being operated upon. If the container walls are entirely resilient, the center plunger may be eliminated. If the reinforcing ring has no tangs which pass through the container rim, then the upper arm assemblies are no longer necessary. These and other modifications may naturally be tailored to the particular tasks required by the constructional details of the products being manufactured.

I claim:
1. Apparatus for applying a reinforcing ring to a container which has an exterior seat portion for the reinforcing ring and a radiating rim portion for retaining the reinforcing ring on the seat portion, said apparatus comprising collapsing means for pressing the walls of a container inwardly until the outside dimensions of the rim portion are less than the inside dimensions of the reinforcing ring, means for holding a reinforcing ring in radial alignment with the seat portion of the container, and expanding means for pressing the container walls outwardly to a position where the rim portion is axially aligned with the reinforcing ring thereby preventing removal of the reinforcing ring from the container.

2. Apparatus according to claim 1 wherein the means for holding the reinforcing ring in radial alignment with the seat portion is attached to and movable with the collapsing means.

3. Apparatus according to claim 1 adapted to apply a reinforcing ring to a rectangular container having sidewalls connected together at parallel edges wherein the collapsing means includes members for pressing the parallel edges radially inwardly to bow the sidewalls inwardly.

4. Apparatus according to claim 3 wherein the means for holding the reinforcing ring in radial alignment with the seat portion is attached to and movable with the collapsing means.

5. Apparatus according to claim 1 wherein the expanding means includes an axially movable plunger member having a tapered area for contacting the interior of the container walls.

6. Apparatus according to claim 5 adapted to apply a reinforcing ring to a rectangular container having sidewalls connected together at parallel edges, wherein the colalpsing means includes members for pressing the parallel edges radially inwardly to bow the sidewalls inwardly.

7. Apparatus according to claim 6 wherein the means for holding the reinforcing ring in radial alignment with the seat portion is attached to and movable with the collapsing means.

8. Apparatus according to claim 1 adapted for applying reinforcing rings having spaced apart axial extensions to containers having apertures in said rim for receiving the axial extensions, said apparatus having positioning means insertable within a container for contacting the interior surface of the sidewalls of a container to hold the walls in a given position, means for axially deflecting the rim portion away from the seat portion prior to operation of the expanding means, whereby the axial extensions on the rings will enter the apertures in said rim upon operation of the expanding means.

9. Apparatus according to claim 8 having means for actuating the positioning means subsequent to the operation of the collapsing means.

10. Apparatus according to claim 8 wherein the expanding means and the positioning means are concurrently movable portions of an axially movable plunger member having a first exterior surface portion operable as said expanding means and a second exterior surface portion operable as said positioning means, and means for moving the plunger to a first position where the positioning means contacts the interior walls of a container in the vicinity of the exterior seat portion, and then to a second position where the expanding means contacts the interior walls of a container in the vicinity of the exterior seat portion.

11. Apparatus for applying a reinforcing ring to an exterior seat portion of a rectangular container having sidewalls connected together at parallel edges and a radiating rim portion for retaining the reinforcing ring on the seat portion, said apparatus comprising collapsing means operable to force the parallel edges radially inwardly to bow the sidewalls inwardly until the outside dimensions of the rim portion are less than the inside dimensions of the reinforcing ring, and means for holding a reinforcing ring in radial alignment with the seat portion of the container whereby the reinforcing ring will lie on said exterior seat when the walls are restored to their initial position.

12. Apparatus according to claim 11 wherein the means for holding the reinforcing ring in radial alignment with the seat portion is attached to and movable with the collapsing means.

13. Apparatus according to claim 11 having an axially movable plunger member movable into the interior of the container and having a tapered area for contacting the interior of the container walls and expanding them outwardly.

14. Apparatus according to claim 13 wherein the means for holding the reinforcing ring in radial alignment with the seat portion is attached to and movable with the collapsing means.

15. Apparatus according to claim 11 and adapted for applying reinforcing rings with spaced apart axial extensions to containers having apertures in said rims for receiving the axial extensions, said apparatus having positioning means insertable within a container for contacting the interior surface of the sidewalls of a container to hold the walls in a given position, means for axially deflecting the rim portion away from the seat portion prior to operation of the expanding means, whereby the axial extension on the rings will enter the apertures in said rim when the container walls are restored to their initial position.

16. Apparatus according to claim 15 having means for actuating the positioning means subsequent to the operation of the collapsing means.

17. Apparatus according to claim 11 having expanding means, operable after release of said collapsing means for pressing the container walls outwardly to a position where the rim portion is axially aligned with the reinforcing ring thereby preventing removal of the reinforcing ring from the container, said expanding means and the positioning means both being portions of an axially movable plunger member having a first exterior surface operable as said expanding means and a second exterior surface operable as said limit means, and actuating means for moving the plunger to a first position where the limit means contacts the interior walls of a container in the vicinity of the exterior seat portion and then to a second position where the expanding means contacts the interior walls of a container in the vicinity of the exterior seat portion.

18. Apparatus according to claim 17 wherein the means for holding the reinforcing ring in radial alignment with the seat portion is attached to and movable with the collapsing means.

19. Apparatus for applying a reinforcing ring to a container which has an exterior seat portion for the reinforcing ring and a radiating rim portion for retaining the reinforcing ring on the seat portion, said apparatus comprising collapsing means for forcing the walls of a container inwardly until the outside dimensions of the rim portion are less than the inside dimensions of the reinforcing ring, and means attached to and movable with the collapsing means for holding a reinforcing ring in radial alignment with the seat portion of the container.

20. Apparatus according to claim 19 adapted to apply a reinforcing ring to a rectangular container having sidewalls connected together at parallel edges wherein the collapsing means includes members for pressing parallel edges radially inwardly to bow the sidewalls inwardly.

21. Apparatus according to claim 19 having expanding means for pressing the container walls outwardly to a position where the rim portion is axially aligned with the reinforcing ring thereby preventing removal of the reinforcing ring from the container, said expanding means including an axially movable plunger member having a tapered area for contacting the interior of the container walls.

22. Apparatus according to claim 21 adapted to apply a reinforcing ring to a rectangular container having sidewalls connected together at parallel edges wherein the collapsing means includes members for pressing the parallel edges radially inwardly to bow the sidewalls inwardly.

23. A method of applying a reinforcing ring to an exterior seat portion of a rectangular plastic container having sidewalls connected together at parallel edges and a radiating rim portion for retaining the reinforcing ring on the seat portion, comprisng the steps of,
(a) simultaneously applying inwardly directed forces to four spaced apart zones on the container to bow the sidewalls inwardly until the outside dimensions of the rim portion are less than the inside dimensions of the reinforcing ring, each of said forces being opposite in direction to another one of said forces,
(b) radially aligning the reinforcing ring with the seat portion of the container,
(c) releasing the forces applied in step (a) to permit the sidewalls to move outwardly until the reinforcing ring lies in the exterior seat portion.

24. The method according to claim 23 wherein step (a) is performed on a heated pliable container, and further including the step of
(d) forcing the sidewalls radially outwardly until the exterior seat portion contacts the reinforcing ring.

25. The method of claim 23 wherein step (a) is performed by applying the inwardly directed forces against the parallel edges of the container.

References Cited

UNITED STATES PATENTS

| | | | |
|---|---|---|---|
| 3,195,228 | 7/1965 | Beacham | 29—200 BX |
| 3,419,182 | 12/1968 | Gildart | 220—73 |
| 3,481,019 | 12/1969 | Whitney | 29—208 B |

THOMAS H. EAGER, Primary Examiner

U.S. Cl. X.R.

29—200 B, 450, 513